United States Patent Office 3,120,535
Patented Feb. 4, 1964

3,120,535
PROCESS OF PREPARING 10-BROMINATED DERIVATIVES OF YOHIMBANE ALKALOIDS
John Shavel, Jr., Mendham, and Harold Zinnes, Denville, N.J., assignors to Warner-Lambert Pharmaceutical Company, Morris Plains, N.J., a corporation of Delaware
No Drawing. Filed Sept. 6, 1961, Ser. No. 136,182
1 Claim. (Cl. 260—288)

The present invention relates to a new and novel method of preparing 10-brominated derivatives of yohimbane alkaloids having the formula

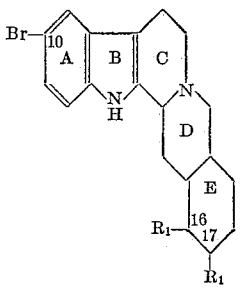

wherein $R_1$ is hydrogen or methyl and $R_2$ is hydrogen, keto or hydroxyl.

The compounds of the above formula have significant pharmacological activity and are useful as anti-inflammatory agents, analgesics and transquilizers. In addition, they are valuable intermediates in the production of other compounds of the yohimbane series. The compounds are described and claimed in the application of John Shavel, Jr. and Maximilian von Strandtmann entitled "10-Haloyohimbane Alkaloids and Process Therefor," filed concurrently herewith.

The method of the present invention is adaptable to the preparation of compounds bearing the A, B, C, D and E rings as depicted in the above structural formula and are, generally, alkaloids of the yohimbane series. Depending upon the configuration of the hydrogen atom at the 3-position and the existence of cis or transfusion of the D and E rings, four different configurations are possible, that is, yohimbane, 3-epiyohimbane, alloyohimban and 3-epialloyohimbane. The present invention includes within its scope a method of preparing derivatives of these four families of alkaloids bearing bromo, $R_1$ and $R_2$ substituents at the 10, 16 and 17 positions respectively.

We have found that the 10-brominated derivatives having the above formula may be prepared in a novel and efficient manner by the reaction of a compound of the formula

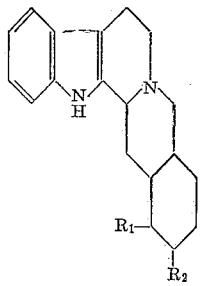

wherein $R_1$ and $R_2$ are as described above with bromine in a solvent system comprising glacial acetic acid and methanol. The reaction goes to completion in a short time at normal ambient temperatures. The precipitate which forms is collected, and after being washed with methanol, is partitioned between chloroform and aqueous ammonium hydroxide. The desired 10-bromo compound is recovered from the chloroform extract by evaporation to dryness and is purified by crystallization.

It has been found that the use of a reaction medium comprising methanol is particularly desirable in facilitating separation and recovery of the product. When methanol is not present, purification becomes difficult.

We have also found that the production of 10-brominated derivatives wherein the $R_1$ substituent is hydrogen and the $R_2$ substituent is keto is facilitated and markedly higher yields are obtained if the keto group of the starting material is converted to the corresponding ketal form, having the formula

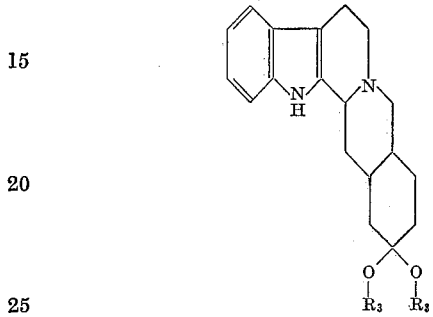

wherein $R_3$ is lower alkyl, prior to reaction with bromine. Such ketals are conveniently prepared by reaction of the 17-keto starting material with a lower aliphatic alcohol of the formula $R_3OH$ in an anhydrous acid medium.

The reaction mixture preferably contains a compound effective in taking up the water formed in the reaction, such as acetone dimethyl ketal.

The following examples are included in order further to illustrate the present invention:

*Example 1.—10-Bromoyohimbane*

To a solution of 14 g. yohimbane in a mixture of 125 ml. glacial acetic acid and 125 ml. methanol is added dropwise with stirring at room temperature a solution of 8.2 g. bromine in 15 ml. glacial acetic acid, the addition taking about 15 minutes for completion. After stirring for an additional 15 minutes, the mixture is allowed to stand at room temperature for two hours and the precipitated solid is then collected and washed in turn with 30 ml. methanol and three 30 ml. portions of dry ether. The solid is refluxed with two 50 ml. portions of methanol, collected by filtration while hot, and washed on the filter with another 50 ml. of hot methanol. The insoluble solid is partitioned between chloroform and aqueous ammonium hydroxide solution, the aqueous layers are further extracted with chloroform, the combined chloroform solution is dried over sodium sulfate, and distilled in vacuo to dryness. Refluxing with 50 ml. methanol causes the residue to crystallize; the hot mixture is filtered and the insoluble crystals washed with two 25 ml. portions of hot methanol to yield 7.8 g. of solids, M.P. 235–240°, $[\alpha/_D]^{25}$—76° (pyridine, c=0.7). A portion is recrystallize from methanol to give 10-bromoyohimbane, M.P. 236–241°, $[\alpha/_D]^{25}$—73° (pyridine, c=0.7).

*Analysis.*—Calc.: C, 63.51; H, 6.45; N, 7.80; Br, 22.24. Found: C, 63.29; H, 6.55; N, 7.58; Br, 22.53.

*Example 2.—10-Bromo-16α-Methylyohimbone*

To a solution of 3.1 g. 16α-methylyohimbone in a mixture of 25 ml. glacial acetic acid and 50 ml. methanol is added dropwise with stirring at room temperature a solution of 1.6 g. bromine in 4 ml. glacial acetic acid, the addition taking about 15 minutes for completion. After stirring for an additional 15 minutes, the mixture is allowed to stand overnight at room temperature. The solid which separates is collected and washed on the filter with 25 ml. methanol. It is then refluxed with 50 ml. methanol, filtered while hot, and washed on the filter with 10 ml. hot methanol. The insoluble solid is partitioned between chloroform and aqueous ammonium hydroxide solution. The chloroform solution is dried over sodium sulfate and distilled in vacuo to dryness. The residue is recrystallized twice from methanol to give 760 mg. of 10-bromo-16α-methylyohimbone, M.P. 276–280°, /α/$_D^{25}$ −61° (pyridine, c=0.67).

Analysis.—Calc.: C, 62.02; H, 5.98; N, 7.23; Br, 20.63. Found: C, 61.70; H, 6.25; N, 7.20; Br, 20.89.

*Example 3.—10-Bromo-16α-Methylyohimbol*

To a solution of 15.5 g. 16α-methylyohimbol in a mixture of 125 ml. glacial acetic acid and 125 ml. methanol is added dropwise with stirring at room temperature a solution of 8.2 g. bromine in 15 ml. glacial acetic acid, the addition taking about 15 minutes for completion. After stirring for an additional 15 minutes, the mixture is allowed to stand overnight at room temperature. The mixture is allowed to evaporate spontaneously (without heat) to a volume of 100 ml. and then is treated with 500 ml. absolute ether. The white precipitate which separates from solution is collected and triturated with two 25 ml. portions of methanol. The insoluble solid is partitioned between chloroform and aqueous ammonium hydroxide solution. The aqueous layer is further extracted with chloroform, the combined chloroform layers are dried over sodium sulfate, and distilled in vacuo to dryness. The residue becomes crystalline on trituration with 25 ml. acetonitrile. The crystals are collected and recrystalized from 50 ml. acetonitrile to give 6.5 g. of crystals, M.P. 227–234°, /α/$_D^{25}$ 0°, (pyridine, c=0.62), /α/$_D^{25}$ +21°, (methanol, c=0.5). Another recrystallization from acetonitrile gives, M.P. 233–237°, /α/$_D^{25}$ 0°, (pyridine, c=0.7), /α/$_D^{25}$ +21°, (methanol, c=0.5).

Analysis.—Calc.: C, 61.69; H, 6.47; N, 7.20; Br, 20.53. Found: C, 61.36; H, 6.63; N, 7.07; Br, 20.90.

*Example 4.—10-Bromoyohimbone*

Attempts to react yohimbone with bromine by the procedure of Example 1 result in low yields. Conversion of yohimbone to its dimethyl ketal (17,17-dimethoxyyohimbone) prior to reaction with bromine resulted in a markedly improved yield.

A mixture of 73.5 g. yohimbone, 75 ml. 6 N methanolic hydrogen chloride, 100 ml. acetone dimethyl ketal, and 3000 ml. methanol is refluxed until the infrared spectrum of a small sample showed complete absence of carbonyl absorption; this requires 3–4 hours time. The resulting solution is distilled at atmospheric pressure to a volume of about 1000 ml. and then is allowed to stand overnight at room temperature. The crystals which separate are collected and the filtrate is concentrated further to obtain additional crops of yohimbone dimethyl ketal hydrochloride. The combined crops are partitioned between aqueous ammonium hydroxide and methylene chloride and the methylene chloride solution is dried over sodium sulfate and distilled in vacuo to dryness to yield an oil. This is refluxed with 250 ml. methanol and allowed to stand at room temperature whereupon 77.6 g. of crystalline yohimbone dimethyl ketal base separates out; M.P. 124–127°, /α/$_D^{25}$ −58° (pyridine, c=0.65). The infrared spectrum showed complete absence of carbonyl.

A solution of 34 g. yohimbone dimethyl ketal, prepared as described above, in a mixture of 350 ml. glacial acetic acid and 700 ml. methanol is cooled to −40° to −50° and a solution of 17.6 g. bromine in 50 ml. glacial acetic acid is added dropwise with stirring over a period of 20 minutes. The reaction mixture is stirred at this temperature for an additional 30 minutes. To the solution are then added 8 liters absolute ether and the resulting precipitate is collected by filtration; it is partitioned between chloroform and aqueous ammonium hydroxide and the chloroform solution is distilled in vacuo to dryness. The resulting oil is dissolved in 300 ml. glacial acetic acid and 900 ml. water, and 5 ml. concentrated hydrochloric acid are added. The resulting solution is heated on a steam bath (60°) for 10 minutes, cooled, and basified by the addition of ammonium hydroxide. The resulting precipitate is washed with water, air-dried and crystallized from methanol to give 16.5 g. of 10-bromoyohimbone, M.P. 298–300°, /α/$_D^{25}$ −66° (pyridine, c=0.53).

Analysis.—Calc.: C, 61.13; H, 5.67; N, 7.51; Br, 21.41. Found: C, 61.35; H, 5.83; N, 7.44; Br, 21.50.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

A method of preparing a compound of the formula

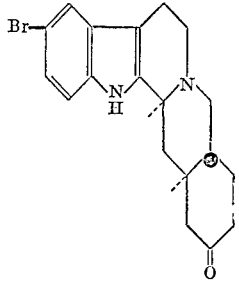

which comprises treating a compound of the formula

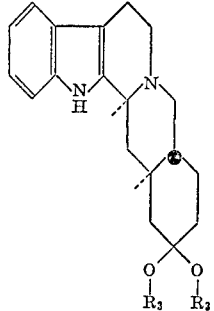

wherein $R_3$ is lower alkyl with bromine in the presence of glacial acetic acid and methanol.

References Cited in the file of this patent

UNITED STATES PATENTS 2,912,436     Weisenborn _____ Nov. 10, 1959

OTHER REFERENCES

Barger et al.: Jour. Chem. Soc. of London, volume 107 (1915), pages 1026 and 1027.

Gall et al.: J. Org. Chem., volume 20 (1955), page 1541.

UNITED STATES PATENT OFFICE
CERTIFICATE OF CORRECTION

Patent No. 3,120,535                          February 4, 1964

John Shavel, Jr., et al.

It is hereby certified that error appears in the above numbered patent requiring correction and that the said Letters Patent should read as corrected below.

Column 1, lines 15 to 25, the formula should appear as shown below instead of as in the patent:

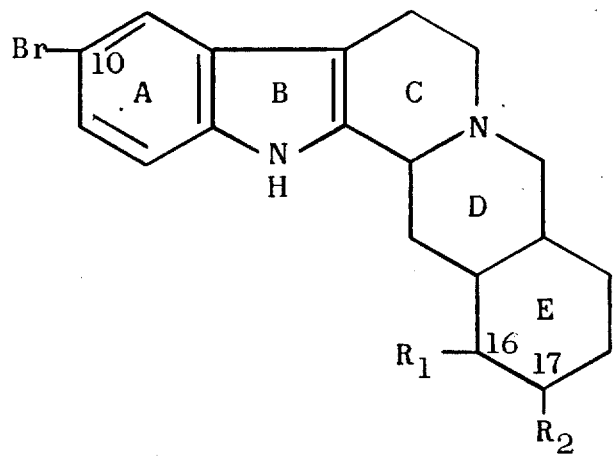

same column 1, line 30, for "transquilizers" read -- tranquilizers --.

Signed and sealed this 23rd day of June 1964.

(SEAL)
Attest:

ERNEST W. SWIDER                        EDWARD J. BRENNER
Attesting Officer                       Commissioner of Patents